Feb. 13, 1968 ATSUO HIRAYAMA ETAL 3,368,377
METHODS OF BENDING ELECTRICALLY CONDUCTIVE LONG MATERIALS
SUCH AS BAR, ROD, AND PIPE, AND MEANS THEREFOR
Filed Sept. 17, 1965 2 Sheets-Sheet 1
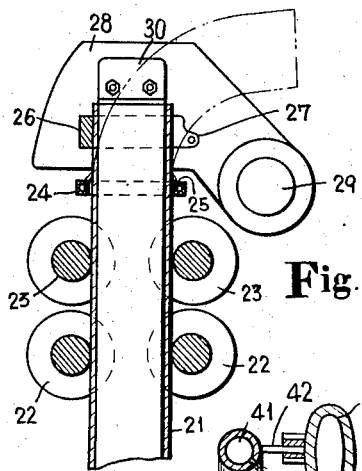
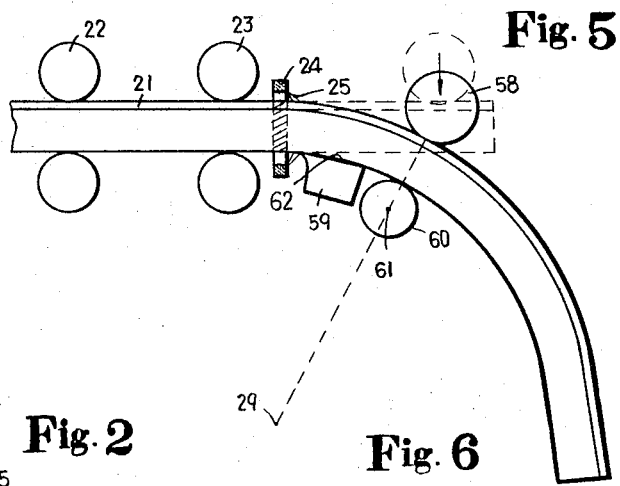
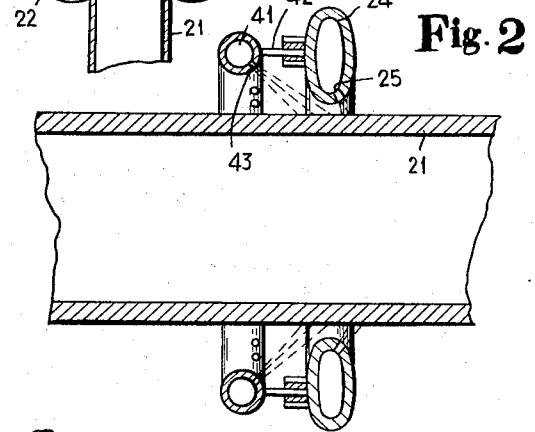
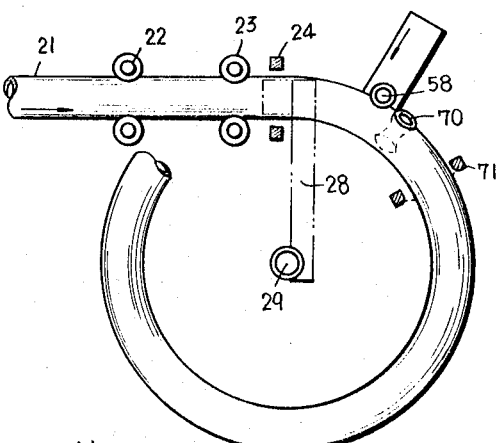
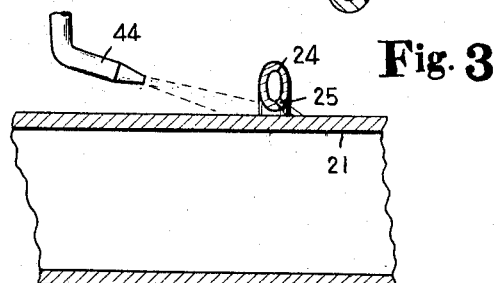
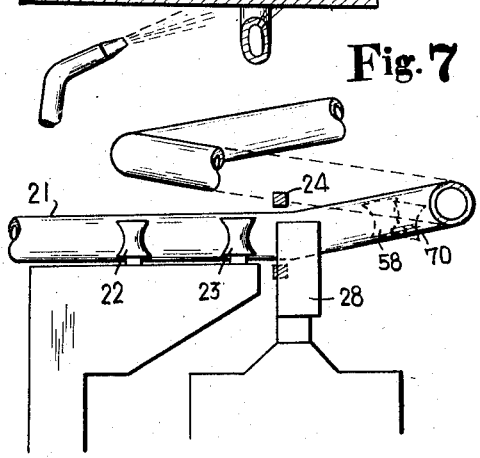
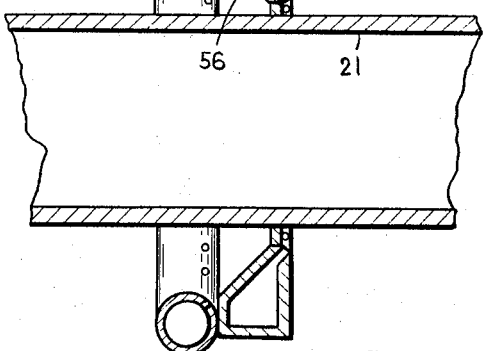
INVENTORS:
ATSUO HIRAYAMA and
BY   TATSUMI OKAMOTO
Attorney

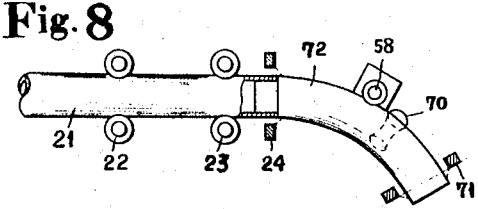
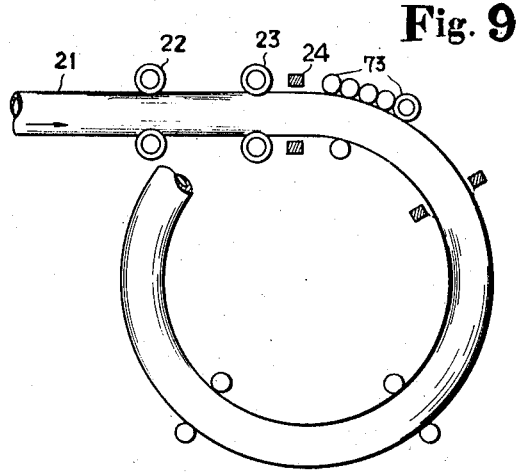
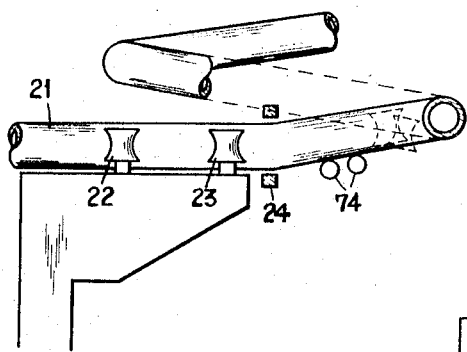
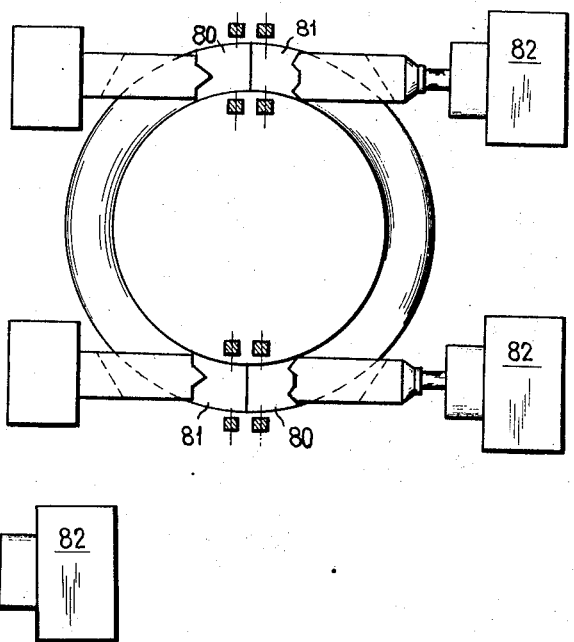
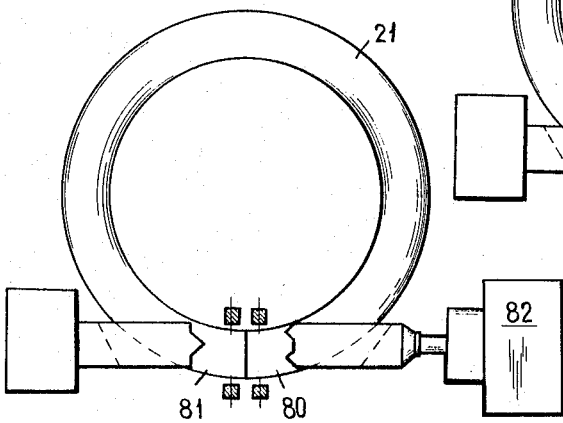
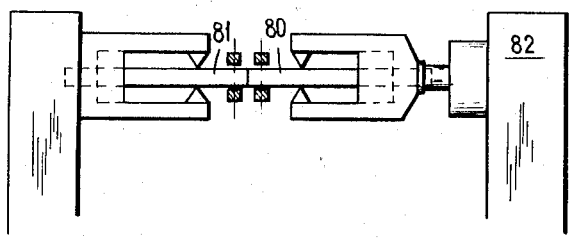

3,368,377
METHODS OF BENDING ELECTRICALLY CONDUCTIVE LONG MATERIALS SUCH AS BAR, ROD, AND PIPE, AND MEANS THEREFOR
Atsuo Hirayama, 605 Sendaizaka Mansion, 8–19 4-chome, Higaski-ooi, Shinagawa-ku, Tokyo, Japan, and Tatsumi Okamoto, 2540–6 Hiyoshi Hon-cho, Kohoku-ku, Yokohama, Japan
Filed Sept. 17, 1965, Ser. No. 488,163
18 Claims. (Cl. 72—128)

ABSTRACT OF THE DISCLOSURE

Methods of and apparatus for bending elongated electrically conductive materials by advancing the material to and through an inductive heating zone with guiding of the material at a location spaced beyond the heating zone and effecting bending at the heating zone by forces applied at the guiding location. The cooling action may restrict the spread of the heat along the material. Air jets may limit the splash back of cooling water. The cooling is optionally at or beyond the heating zone depending on whether hardening or annealing is desired. The resulting configuration may be arcuate, semi-circular, ring shaped or in a coil.

---

This invention relates to methods of bending electrically conductive elongated materials such as bar, rod, and pipe, and means therefor.

The principal object of this invention is to provide a method of and a means for bending electrically conductive elongated material such as bar, rod, and pipe, whereby the cross section of the material will not be deformed substantially even if the bending radius is considerably small.

Another object of this invention is to provide a means for bending electrically conductive elongated material such as bar, rod, and pipe, which is cheap to produce and effective in use.

According to this invention, an elongated material is successively bent along a circle simultaneously with being advanced through a heating station which is formed around the long material and in a radial plane. The center of the circle is positioned in the plane. And a cooling station is formed around the long material and in another radial plane positioned after the heating station.

The method of this invention is especially useful in fabricating a coil as a component of a heat exchanger or the like. The method of this invention is also especially useful in fabricating a flange to be fixed to and on either external or internal surface of a cylindrical material.

In accordance with the general features of the invention, an electrically conductive elongated material such as bar, rod, pipe and the like is bent while being heated simultaneously in a single stage operation. In accordance with the prior art, a two-staged operation is generally required for such a hot working. In accordance with this invention, the long material is pushed longitudinally for advance thereof, while, in accordance with the prior art, such a material is pulled in general. By virtue of the hot working by pushing the material longitudinally, the material is compressed longitudinally while hot so as to creep the material radially outwards whereby, in case a pipe is bent, the radial cross-section thereof is not deformed substantially so that such a preliminary measure as filling the pipe with sand is omitted. Thus in case a round rod or pipe is bent, the roundness is substantially secured. In case a material having a rectangular cross section is fabricated, the difference in thickness between the radially outer edge and inner edge is smaller than that correspondingly cold-worked by pulling. Such difference may be made still smaller by passing the material between the rollers arranged on and under the material already bent while it still hot. It is also possible to heat the material partl differently in a cross section so as to creep the materi: exclusively radially outwards.

If the material is heated by an induction heating mear and cooled as soon as possible thereafter, scaling may t minimized. It is possible to completely anneal the fabr cated material such as stainless steel by a suitable arrang ment of the cooling station. It is also possible to quenc a material into a desired hardness. On the contrary, it still also possible to prevent a material from quenching t arranging the cooling station in a proper location whei the fabricated material is passed after naturally coole down to a temperature lower than the quenching temper: ture. In any case, by virtue of the procedure of complete] cooling during the bending operation, neither spring bac nor further deformation occurs.

In case the diameter of the bending is large, it is a( vantageous to bend the material in a vertical plane i view of the horizontal area required to install a machir in accordance with this invention. In case a long coil to be fabricated from rather short lengths of material, is possible to join one length after another by, for exan ple, welding while being straight prior to the bending, s that, in case of fabrication of a stainless steel material, tl material is annealed simultaneously with the bendin, whereby another operation for annealing the coil suppor ed by a frame becomes unnecessary which has been r( quired in the art in spite of the disadvantageous tendenc of deformation. In case the material is too thick, it is preferred to provide a preliminary heating means for tl material to be fabricated.

Preferred forms of this invention will now be describe with reference to the accompanying diagrammatic drav ings in which:

FIG. 1 is a sectional view of a bending machine en bodying the principles of this invention, taken in a plar where the axis of a bent material lies;

FIG. 2 is a fragmentary view of an essential part ai other bending machine embodying the principles of th invention;

FIG. 3 is a fragmentary view of an essential part of s'i another bending machine embodying the principles of th invention;

FIG. 4 is a fragmentary view of an essential part ( another bending machine embodying the principles of th invention;

FIG. 5 is a similar view to FIG. 1, showing a modifi( form;

FIG. 6 is a similar view to FIG. 1, showing a cc fabricating machine in accordance with this invention;

FIG. 7 is an elevational view thereof;

FIG. 8 is a similar view to FIG. 6, showing a modific tion thereof;

FIG. 9 is also a similar view to FIG. 6, showing a other modification thereof;

FIG. 10 is an elevational view thereof;

FIG. 11 is a plan view of a flange joining machine accordance with this invention;

FIG. 12 is a plan view of another flange joining machii in accordance with this invention; and FIG. 13 is an elevational view thereof.

Reference is now made to FIG. 1 illustrating a bendi machine in accordance with this invention, which coi prises two sets of guide rollers 22 and 23, a high fr quency induction heating and water cooling apparatus 2 and a bending element 28. The two sets of guide rolle 22 and 23 are adapted to guide a steel pipe 21 being a vanced towards the bending element 28 by a suitat conventional pushing means not shown. The high fr quency induction heating and water cooling apparatus : is an annular pipe arranged concentrically with ai round the steel pipe 21 with a space therebetween. The annular pipe 24 is filled with water for cooling the annular pipe itself. The water is made to flow suitably by a conventional means. A plurality of perforations 25 are formed through the wall of the annular pipe 24. The perforations 25 are arranged longitudinally to and inside the annular pipe 24 and directed somewhat slanting to the advancing direction of the steel pipe 21 so that a circumferential external zone of the advancing steel pipe 1 being bent as set forth hereinafter is cooled by the water sprayed through the perforations 25 owing to the disposition of the perforations 25, the cooling station is positioned somewhat behind the induction heating station in the advancing direction of the steel pipe 21. The bending element 28 comprises a flat arm swingably supported by a shaft 29, a receiver 26 for clamping temporarily the head of the steel pipe 21 to the flat arm 28, and a stopper 0 for abutting the head. The shaft 29 is positioned within the plane of the annular pipe 24 and the plane is normal to the axis of the steel pipe 21 before bent.

In operation, the head of the steel pipe 21 is inserted between the pairs of guide rollers 22 and 23 and through the annular pipe 24 of the heating station and abutted against the stopper 30. The head is clamped down to the flat arm 28 by the receiver 26 provided with a screwing means 27. Then the electrical induction heating and water cooling annular pipe 24 is energized by suitable electric power and supplied with water and the steel pipe 21 is advanced by a conventional means not shown at a suitable constant speed. By advancing the steel pipe 21 axially that is to say longitudinally towards the annular pipe 24, the pipe 21 heated by the annular pipe 24 is bent between the said heating station and the said cooling station, by virtue of the temporary clamping to the flat arm 28 which is permitted to be driven by the steel pipe 1 along a circle but never pushes nor pulls the steel pipe 21.

The material to be bent may be in the form of rod, bar, pipe, and the like and may be of steel, copper, copper alloy, and light alloys, for example. The heating may be induction heating by medium and low frequency currents other than high frequency. It is preferred to direct the jet of water at most at an angle of 35° to the axis of the steel pipe 21. When the axis is horizontal, splash from the water if directed at an angle over 35° would disturb the heating operation. When the axis is vertical, it is necessary to prevent the heated zone of the external surface of the long material such as the steel pipe 21 from any splash and back flow of the water. A suitable provision to this end will be described hereinafter.

The length of the heated zone along the axis of the material to be bent is generally appreciably short such as two to three millimeters. A pipe having a wall one millimeter thick may be bent by the method and means in accordance with this invention, while in previously known methods it has been difficult to bend a pipe having a wall of less than three millimeters thick because of formation of bellows.

If the material being bent is steel, it is heated up to temperature of about 1,000° C. This temperature is of course modified depending upon the kind of material to be fabricated. If the bending radius is small, induction heating is preferable but when the bending radius is large, it is also possible to heat the material by a gaseous medium at an elevated temperature.

Reference is now made to FIGS. 2, 3, and 4 illustrating some form of air jet means which are preferably attached to the water spraying means. In the embodiment shown in FIG. 2, another annular pipe 41 is provided in front of the induction heating and water cooling annular pipe 24. The pipe 41 is arranged coaxially and in parallel with the pipe 24 and supported in place insulating supports 42. Alternatively, other support means may be provided for pipe 41. The annular pipe 41 is provided with a plurality of air jetting perforations 43 arranged longitudinally to and inside the pipe 41 and directed rearwards onto the surface of the material 21 in such a manner that any splash and back flow of the water sprayed onto and around the surface of the heated material 21 is blown away rearwards by the air jets from the perforations 43. A conventional air feeding means (not shown) is connected to the annular pipe 41 whereby the later is supplied with compressed air.

In the embodiment shown in FIG. 3, a number of air jet nozzles 44 are provided arranged along a circle instead of the air jet pipe 41 of FIG. 2.

In the embodiment shown in FIG. 4, the air jet pipe 41 is directly joined with the induction heating and water spraying pipe 54, so that the air jet pipe 41 forms a part of the electrical induction heating apparatus and thus also serves to heat the material 21. The cross section of the induction heating and water spray pipe 54 is rectangular with a slanting portion 56 which serves to guide the air to the jet nozzles 55.

Referring now to FIG. 5, a modification is shown, in which an offset roller 58 is substituted for the flat arm 28 shown in FIG. 1. The offset roller 58 is positioned in contact with the rectilinear extension of a side, which is the outer one in terms of the bending of the material 21 to be bent as shown in a broken line, and is adapted to be desplaceable towards the material 21 in a direction intersecting the axis of the material 21 at the right angle by means of, for example, a hydraulic means or a screw and nut driving arrangement.

In operation, the head of the material 21 to be bent is inserted between the pairs of guide rollers 22 and 23 and through the ringed pipe 24 of the induction heating station 24 and placed in contact with the offset roller 58. The heating station and the water spray are actuated so as to heat the band of the material 21 between the heating station and the cooling station up to a temperature of, for example, in case of a steel rod, about 1,000° C. When the temperature approaches the predetermined value, advance of the material 21 and displacement of the offset roller 58 are started so that the head of the material 21 is pushed aside and bent as shown in the solid line in FIG. 5. When the roller 58 has been displaced by a predetermined amount, the material 21 is brought into contact with a guide block 59 and a receiving roller 60 rotatably mounted on a shaft 61, which are fixed to a stationary frame of the machine. The guide block 59 is provided with a guide surface 62 having a curvature corresponding to the inner curvature of the bent material 21, of which the center 29 is positioned within the extension of the plane of the heating station 24.

Reference is now made to FIGS. 6 and 7, illustrating a coil fabricating machine. In this coil fabricating machine, there are such components as two sets of guide rollers 22 and 23 and a swingable arm 28, similarly to the embodiment shown in FIG. 1, and a roller 58 similarly to the embodiment shown in FIG. 5. The cooling station may be provided just behind the heating station as in the preceding examples, but provision of another cooling station 71 is required as set forth hereinafter. The head of a straight long pipe 21 is temporarily clamped by the swingable arm 28 as in the first embodiment, but it is disengaged from the arm after the head has been brought into contact with the roller 58. The pipe 21 is bent by being pushed against the roller 58 and further coiled by being pushed against a coiling roller 70 arranged in the proximity of the roller 58. The coiling roller 70 is mounted rotatably on a slanting shaft so as to slope the bent pipe 21. The bent and sloped pipe 21 is then passed through the additional cooling station consisting of an annular pipe 71 provided with water jets so as to stabilize the curvature.

It is possible to adjust the curvature of the bending or the diameter of the coil by varying the length of the swingable arm 28. It is necessary to displace the shaft 29 for varying the length of the swingable arm 28 and also to position the shaft 29 within the extension of the plane of the annular pipe 24 as set forth hereinbefore. It is also necessary to displace the offset roller 58 and the coiling roller 70 radially so as to be brought into contact with the pipe 21 when the head thereof is guided by the swingable arm 28. In order to adjust the pitch of the coil, the inclination of the slanting shaft of the coiling roller 70 is adjusted. The offset roller 58, the coiling roller 70, and the additional cooling station 71 are displaceable vertically. In operation, after the head of the pipe 21 has been brought into contact with the offset roller 58 and the coiling roller 70, the two rollers are displaced vertically or axially relative to the coil by a predetermined height, which is relative to the inclination of the coiling roller 70, whereby the pitch of the coil is defined.

In the modification shown in FIG. 8 of this coil fabricating machine, the swingable arm 28 is omitted, but a leader 72 is used. The leader 72 is a length of the bent pipe 21 which is temporarily joined axially to the head of the still straight pipe 21 in such a manner that the leader 72 is arranged in contact with the offset roller 58 and the coiling roller 70. After the pipe 21 itself has been advanced axially so as to be bent in contact with the two rollers 58 and 70, the leader 72 is removed from the head of the bent pipe 21.

In another modification shown in FIGS. 9 and 10 of this coil fabricating machine, a plurality of vertical fabricating rollers 73 are substituted for the swingable arm 28, offset roller 58, and the leader 72. A plurality of the vertical fabricating rollers 73 are arranged along the outside curve of the coil to be formed so as to bend the head of a straight pipe 21 heated at the heating station 24 and being pushed axially against the vertical fabricating rollers 73 and direct it to the cooling station 71. In addition, a plurality of horizontal fabricating rollers 74 mounted on radial and stepwise elevated shafts, respectively, are arranged horizontally across the coil thereunder so as to lead the head of the pipe 21 thereon and raise it gradually along a predetermined slope while it is still hot. By virtue of the provision of these fabricating rollers 73 and 74, the full length of the pipe 21 is progressively fabricated into a coil. In order to modify the diameter and the pitch of the coil, it is necessary that the arrangement of these fabricating rollers 73 and 74 is adjustable vertically and/or horizontally.

In these coil fabricating machines, some auxiliary rollers may be provided. Some of them are arranged vertically outside and/or inside the curve of the bent pipe 21 and others are arranged horizontally under the pipe 21. The latters are provided in order to support the sloping pipe 21.

Reference is now made to FIGS. 11, 12 and 13, illustrating flange joining machines in accordance with this invention. The head 80 and tail 81 of a circularly bent material 21 fabricated by means set forth hereinbefore, abutted against each other, are clamped and pressure-welded by means of the flange joining machine 82. In case of a small-sized flange, ordinary welding may be applied. Referring to FIG. 12, two semi-circularly bent pieces of the material fabricated in accordance with this invention may be joined, abutting two heads and two tails, respectively, by means of actuating two sets of the flange joining machines 82 as shown in FIG. 12.

What is claimed is:

1. A method of bending an electrically conductive elongated material progressively along an arcuate path, comprising:
    advancing the material longitudinally toward and beyond a heating station disposed in surrounding relation to the material in a plane normal to the advancing direction,
    inductively heating the material in an annular band progressively from the head to the tail during said advancing,
    progressively cooling the heated material at a locatic beyond the heated band, and
    continuously guiding said material at a location b yond the cooling location and thereby effecting ben ing of the material at the annular band.

2. A method as defined in claim 1 in which:
    said cooling is effected by directing water against tl material.

3. A method as defined in claim 2 which additional includes:
    directing air against the material contiguous to tl water to prevent splash and back flow of the wat onto the band.

4. A method as defined in claim 1 in which:
    said advancing is effected by applying force to sa material prior to said heating of said material.

5. A method as defined in claim 1 which includes:
    annealing the material during the bending operatic and prior to said cooling.

6. A method as defined in claim 1 which includes:
    hardening the material during the bending by sa cooling.

7. A method as defined in claim 1 in which:
    said arcuate path is in a plane, and
    advancing the bent material in offset relation to sa plane to form the material into a coil.

8. A method as defined in claim 1 which include forming said material into a ring, and
    forming a flange on said ring.

9. A method as defined in claim 1 which includes:
    forming said material into two semi circular piece and
    joining said pieces at their ends to form a ring.

10. A machine for bending electrically conductive elo gated material which comprises:
    pushing means for advancing said elongated materi
    electric inductive heating means having an annular pi with a central opening disposed in a plane norm to the direction of advance of said material f advance of the material through said opening,
    said annular pipe being in surrounding and spac relation to said material,
    cooling means beyond said heating means for cooli the material, and
    guiding means in spaced relation beyond said heati means in engagement with said material and bendi said material is an arcuate path as it passes sa heating means.

11. A machine as defined in claim 10, in which:
    said annular pipe is a high frequency electric heati electrode.

12. A machine as defined in claim 10, in which:
    at least one additional cooling means is provided f acting on the material.

13. A machine as defined in claim 10, in which:
    said annular pipe is adapted to spray water therefro so as to serve said cooling means.

14. A machine as defined in claim 13, in which:
    air jet means are provided for preventing back-splas ing of water from the cooling means to the materi in the vicinity of the heating means.

15. A machine as defined in claim 10, in which:
    said guiding means comprises a swingable arm which curved and which guides advancing material alo said path.

16. A machine as defined in claim 10, in which:
    said guiding means comprises an offset roller whi guides the advancing material along said path.

17. A machine as defined in claim 11 comprising:
    a sloping device which guides the material additic ally in a direction which is normal to said circul path, whereby the material is formed into a coil.

18. A machine as defined in claim 17 in which:
    said guiding means comprises a plurality of rolle with vertical axes arranged along the outside curve of the coil to be formed, and said sloping device comprises a plurality of rollers with horizontal axes, arranged radially and stepwise elevatedly under the coil.

References Cited
UNITED STATES PATENTS

| | | | |
|---|---|---|---|
| 408,006 | 7/1889 | Fowler | 72—145 |
| 785,083 | 3/1905 | Brinkman | 72—128 |
| 913,004 | 2/1909 | Gordon | 72—128 |
| 972,928 | 10/1910 | Schneider | 72—145 |
| 1,891,338 | 12/1932 | Snell | 72—128 |
| 3,169,893 | 2/1965 | Wuerfel | 148—131 |
| 3,229,489 | 1/1966 | Huet | 72—128 |

CHARLES W. LANHAM, *Primary Examiner.*

RICHARD J. HERBST, *Examiner.*

L. A. LARSON, *Assistant Examiner.*

UNITED STATES PATENT OFFICE
CERTIFICATE OF CORRECTION

Patent No. 3,368,377 February 13, 1968

Atsuo Hirayama et al.

It is hereby certified that error appears in the above numbered patent requiring correction and that the said Letters Patent should read as corrected below.

Column 6, line 47, for "is" read -- in --.

Signed and sealed this 1st day of April 1969.

(SEAL)
Attest:

Edward M. Fletcher, Jr.
Attesting Officer

EDWARD J. BRENNER
Commissioner of Patents